United States Patent [19]
Harry et al.

[11] Patent Number: 5,803,598
[45] Date of Patent: Sep. 8, 1998

[54] HAND-HELD ELECTRIC BEATER-MIXER

[75] Inventors: Jean-Michel Harry, Marolles-les-Braults; Jean-Pierre Trocherie, Saint-Pierre-des-Nids; Jean-Jacques Linger, Laval, all of France

[73] Assignee: Moulinex S.A., Paris, France

[21] Appl. No.: 894,016

[22] PCT Filed: Feb. 12, 1996

[86] PCT No.: PCT/FR96/00219

§ 371 Date: Sep. 18, 1997

§ 102(e) Date: Sep. 18, 1997

[87] PCT Pub. No.: WO96/25080

PCT Pub. Date: Aug. 22, 1996

[30] Foreign Application Priority Data

Feb. 16, 1995 [FR] France .................................. 95 01795

[51] Int. Cl.[6] ............................. A47J 43/07; B01F 13/04
[52] U.S. Cl. ........................................... 366/129; 366/344
[58] Field of Search .................................... 366/129, 130, 366/142, 197, 199, 206, 342–344, 601; 310/50

[56] References Cited

U.S. PATENT DOCUMENTS

| 3,328,001 | 6/1967 | Zasadny et al. | 366/129 |
|---|---|---|---|
| 3,533,600 | 10/1970 | Gerson | 366/129 |
| 3,595,093 | 7/1971 | Du Bois . | |
| 3,604,114 | 9/1971 | Swanke et al. . | |
| 3,619,754 | 11/1971 | Fuchs | 366/129 X |
| 5,316,382 | 5/1994 | Penaranda et al. | 366/129 |

FOREIGN PATENT DOCUMENTS

| 1429176 | 10/1968 | Germany | 366/129 |
|---|---|---|---|
| 28 02 155 | 7/1979 | Germany . | |
| 29 04 159 | 12/1979 | Germany . | |
| 3942712 | 6/1991 | Germany | 366/129 |
| 4119328 | 12/1992 | Germany | 366/129 |
| 954180 | 4/1964 | United Kingdom . | |

*Primary Examiner*—Charles E. Cooley
*Attorney, Agent, or Firm*—Young & Thompson

[57] ABSTRACT

A hand-held electric beater-mixer comprises a drive motor (7), two coupling devices (20, 28) linked to the motor and engageable by a whisk and a mixing accessory (38) respectively, an electrical switch (71) operated by a button (67) having an "off" position, a number of "continuous on" positions and a "selective on" position, a vertical movable ejector (51), and a mechanical assembly (72) for preventing continuous operation when the mixing accessory is in place. The mechanical assembly comprises a movable member (74) which releases the ejector when the whisk is in place. The ejector has an engagement tab (53) enabling operation of the button when the ejector is in the raised position, and locks the ejector (51) in the lowered position when the mixing accessory is in place. The engagement tab (53) of the ejector locked in the lowered position locks the button (67) on the side corresponding to its "continuous on" positions.

6 Claims, 3 Drawing Sheets

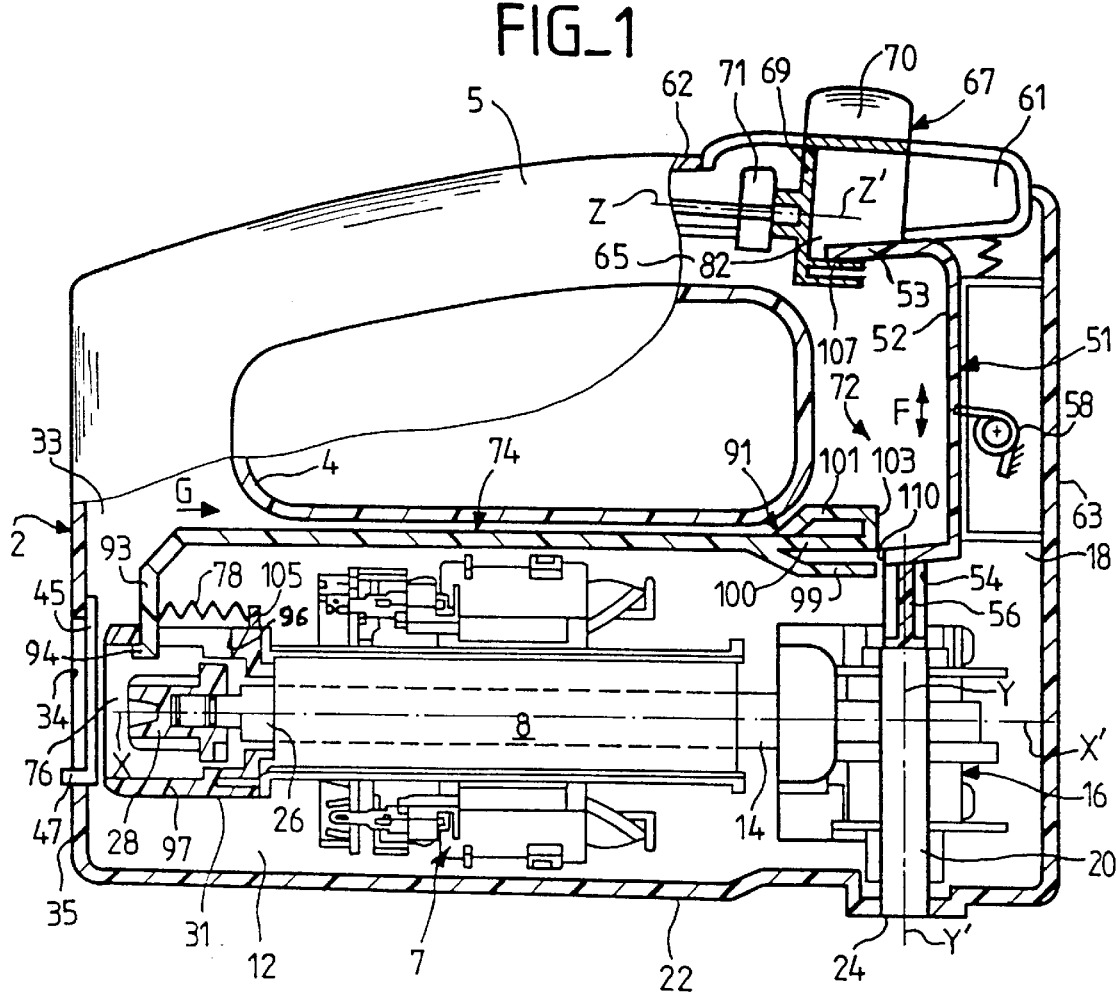
FIG_1
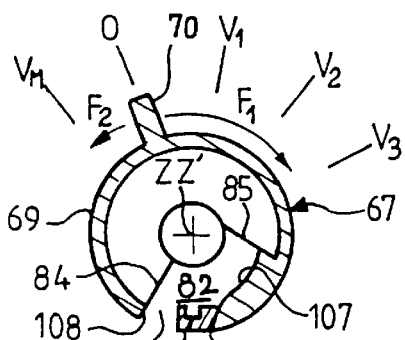
FIG_2
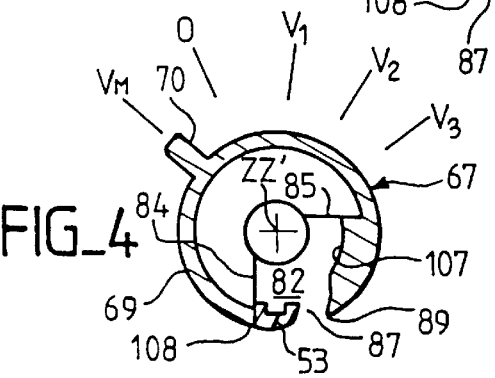
FIG_4
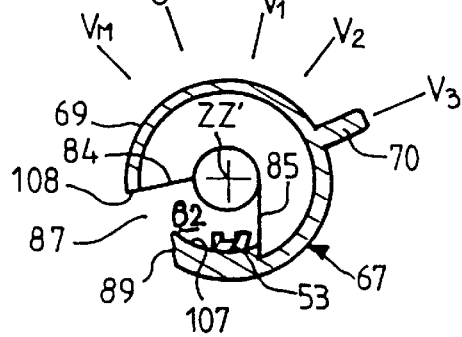
FIG_3

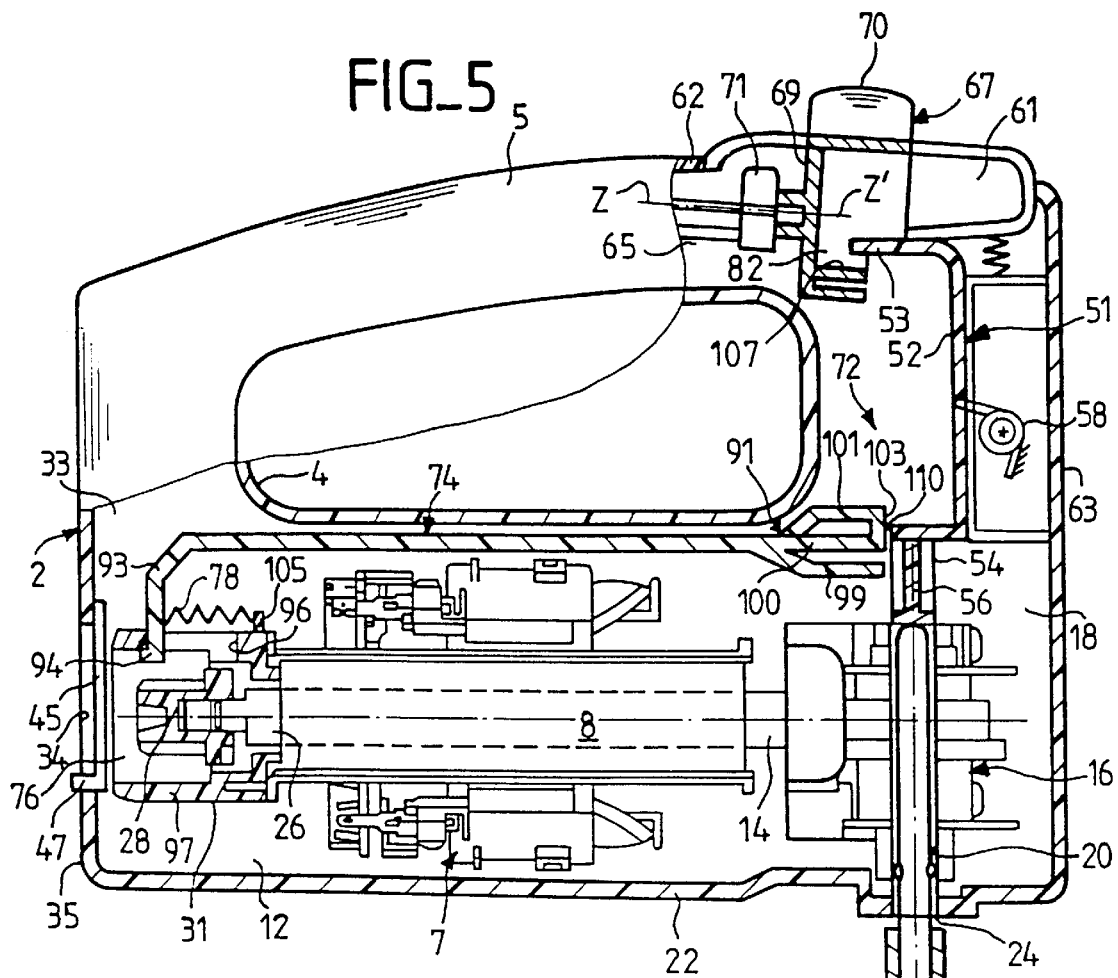
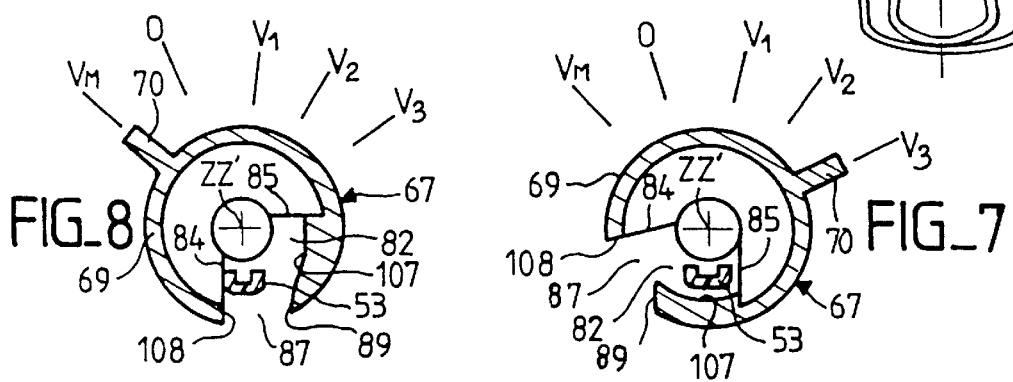
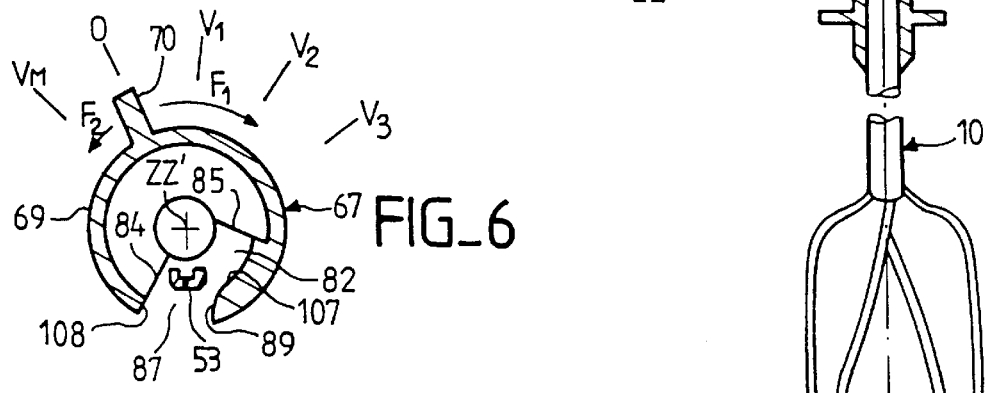

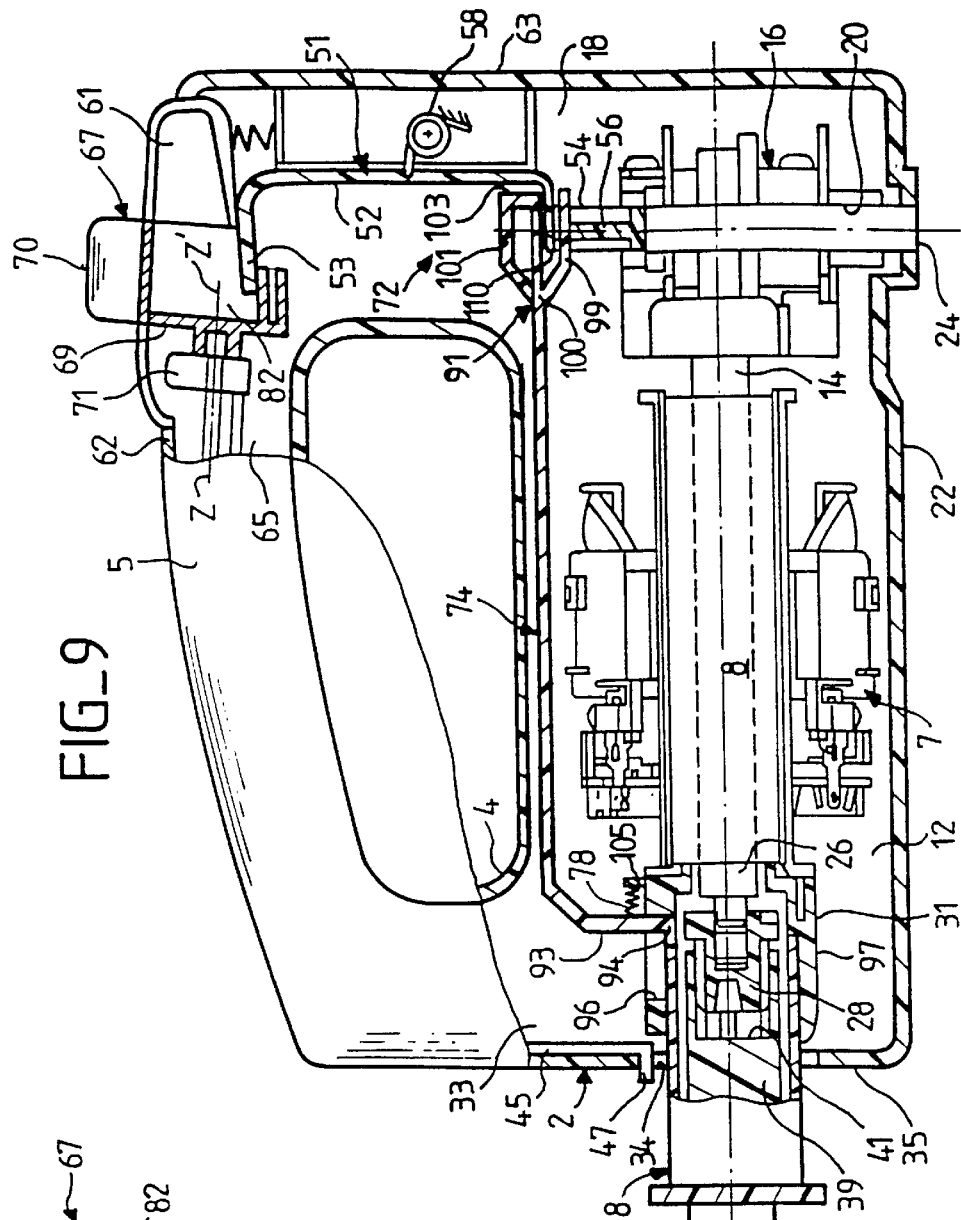
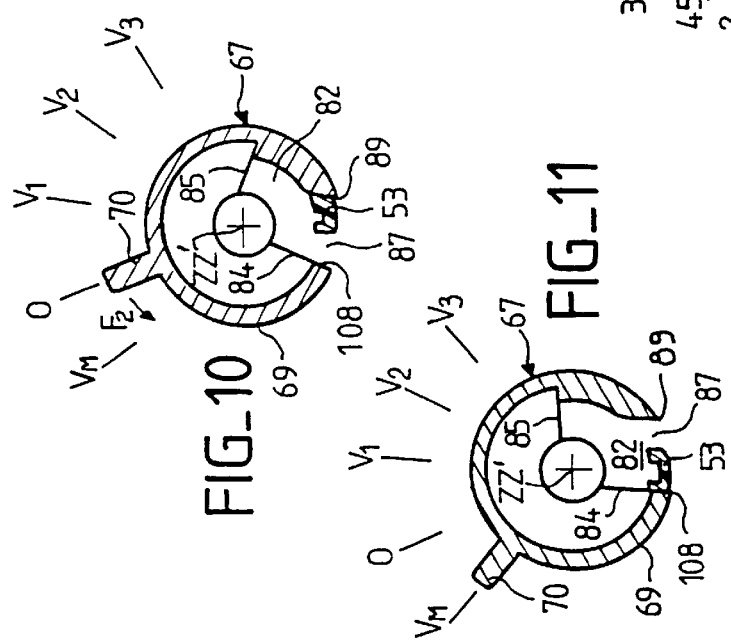

HAND-HELD ELECTRIC BEATER-MIXER

FIELD OF THE INVENTION

The present invention relates to a hand-held electric beater-mixer, particularly a kitchen beater-mixer, adapted to drive selectively at least one beating accessory such as for example a whisk, or a mixing accessory such as for example a mixing foot, comprising a housing of generally prismatic shape enclosing an electric drive motor, two rotatable coupling devices which are associated with the shaft of the motor, of which one opens into the base of the housing through an opening through which the beating mixer can be secured, and of which the other communicates with the exterior of the housing through a coupling opening through which the mixing accessory can be fixed, a control switch for the electric motor which is actuated by a manual operating button having a body mounted in the upper portion of the housing, in the front of the latter in the region overhanging the beating accessory, and which is adapted to occupy a "stop" position, one or several "continuous operation" positions, and an "instantaneous operation" position, an ejection member associated with the coupling device of the beating accessory and displaceable in height from a low position in the absence of the beating accessory to a high position under the action of said beating accessory upon its engagement in the corresponding coupling device, as well as mechanical means preventing bringing the switch into "continuous operation" position when the mixing accessory is inserted in its coupling device and permitting bringing the switch into the "continuous operation" position or into "instantaneous operation" position when the beating accessory is inserted into its coupling device.

There is meant by beating accessory a working tool of the whisk or mixer type, and by mixing accessory an accessory with a working tool turning at high speed of the mixer foot type with rotating helix, or again of the mixing bowl type with rotating knife.

BACKGROUND OF THE INVENTION

There is known an apparatus of this type which responds well to the safety requirements for use consisting in preventing only continuous operation of the motor in the presence of the mixing accessory, for the purpose of preventing operation of the apparatus with its switch blocked into the "continuous operation" position during critical situations such as for example that in which the apparatus in service slips from the hand of the user. In this apparatus, the coupling opening of the mixing accessory is located in the front of the apparatus, on the same side as the rotatable actuating button of the control switch of the electric motor, and the mechanical safety means preventing bringing the switch into the "continuous operation" position in the presence of the mixing accessory, are constituted by a vertical finger which is mounted on a sliding closure associated with the coupling opening of the mixing accessory and which, after opening the closure by sliding in the vertical direction, blocks the rotatable axle of the button from the side of its "continuous operation" positions.

However, there exist at present numerous hand-held electric beater-mixers which themselves comprise a coupling opening for the mixing member which is located, not in the front of the apparatus, but in the rear of the latter, opposite the actuating button for the switch, such that the mechanical safety means of the prior art, described above, are evidently useless for these beater-mixers.

SUMMARY OF THE INVENTION

The invention has for its object to overcome this drawback and to provide a hand-held electric beater-mixer of the type with a coupling opening for the mixing accessory located in the rear of the apparatus, opposite the actuating button of the switch, in which the prevention of bringing the switch into the "continuous operation" position in the presence of the mixing accessory and the permission to bring said switch into "continuous operation" position or into "instantaneous operation" position in the presence of the beating accessory, are obtained by simple and reliable mechanical means, ensuring absolute safety of operation of the apparatus.

According to the invention, a beater-mixer of the type described above, is more particularly characterized in that the coupling opening for the mixing accessory being provided in the rear wall of the housing, the ejection member comprises in its upper portion a drive finger and the mechanical means comprise a movable member which is interposed between the ejection member and the coupling device of the mixing accessory, whose displacement is subordinated to the emplacement of the mixing accessory in its coupling device, against resilient return means, and which is adapted, on the one hand, to free the displacement of the ejection member which passes from its lower position to its upper position when the beating accessory is inserted in its coupling device, the drive finger of the ejection member in upper position freeing the movement of the button, and on the other hand, in blocking the ejection member in the lower position when the mixing accessory is inserted in its coupling device, the drive finger of the ejection member blocked in lower position blocking the button from the side corresponding to the "continuous operation" position.

Thus, the invention uses judiciously the movable ejection member conventionally mounted in this type of apparatus to permit, in a simple manner, blocking the actuating button of the switch preventing it solely from occupying the "continuous operation" positions in the presence of the mixing accessory, and to free this actuating button permitting it to occupy its "continuous operation" or its "instantaneous operation" positions in the presence of the beating accessory.

The characteristics and advantages of the invention will become more apparent from the description which follows, by way of non-limiting example, with reference to the accompanying drawings, in which:

BRIEF DESCRIPTION OF THE INVENTION

FIG. 1 is a fragmentary vertical cross-sectional view of a beater-mixer according to the invention, with the accessory absent;

FIGS. 2, 3 and 4 are transverse cross-sectional views of a manual operating button associated with a drive finger for the beater-mixer of FIG. 1, when the button is in "stop" position (FIG. 2), in "continuous operation" position (FIG. 3), and in "instantaneous operation" position (FIG. 4);

FIG. 5 is a view similar to that of FIG. 1, but with a beating accessory present;

FIGS. 6, 7 and 8 are transverse cross-sectional views of the operating button associated with the drive finger for the beater-mixer of FIG. 5, when the button is in "stop" position (FIG. 6), in "continuous operation" position (FIG. 7), and in "instantaneous operation" position (FIG. 8);

FIG. 9 is a view similar to that of FIG. 1, but with a mixing accessory present; and FIGS. 10 and 11 are transverse cross-sectional views of the operating button associated with the drive finger for the beater-mixer of FIG. 9, when the button is in "stop" position (FIG. 10) and in "instantaneous operation" position (FIG. 11).

DETAILED DESCRIPTION OF THE INVENTION

The hand-held beater-mixer shown in FIG. 1 comprises a housing 2 of generally prismatic shape constituting a hollow portion 4 which delimits a handle 5, and containing an electric drive motor 7 provided with a shaft 8 having an axis XX' and disposed, during normal use with at least one beating accessory such as for example a whisk 10 as shown in FIG. 5, in the lower portion 12 of the housing 2 extending horizontally.

The shaft 8 of the drive motor 7 carries at its forward end 14 an endless screw (not shown) which coacts with two helicoidal pinions each turning about a vertical axis YY' perpendicular to the axis XX', and which forms with this latter a reducer 16. These two helicoidal pinions are situated in the forward portion 18 of the housing and are connected respectively with two coupling devices 20 having axes YY', of which only one is visible in FIG. 1, which open into the base 22 of the housing 2 through two openings 24 through which can be fixed side by side, or one behind the other, two whisks 10 of which only one is shown in FIG. 5.

As to FIG. 1, the rear end 26 of the shaft 8 of the drive motor 7 carries a rotatable drive 28 disposed in a cylindrical socket 31 which extends horizontally within the rear portion 33 of the housing 2 and which is open facing a coupling opening 34 provided in the rear wall 35 of the housing 2 and adapted for the engagement of a mixing accessory such as for example a mixing foot 38 as shown in FIG. 9, which mixing foot 38 (FIG. 9) is adapted to be secured, for example by screwing, in the socket 31 and enclosing a shaft 39 whose forward end 41, opposite the paddle 43 enclosing a helix, not shown, is adapted to be coupled with the drive 28.

In a manner known per se, as shown in FIG. 1, the coupling opening 34 is closed by a sliding closure 45 which is guided on the internal surface of the rear wall 35 of the housing 2 with the possibility of sliding in the vertical direction and which is closed by a finger piece 47 projecting rearwardly through the opening 34.

The beater-mixer comprises moreover a movable ejection member 51 arranged vertically in the front portion 18 of the housing 2 and comprising an upper portion 52 of vertical U shape whose end portion of the upper leg forms a drive finger 53, and a lower portion 54 constituted by two vertical cylindrical pins 56, of which only one is visible in FIG. 1, each coacting with the corresponding coupling device 20. This ejection member 51 is urged by a spring 58 and passes from a lower position, defined in the absence of the whisks (FIG. 1), to an upper position in which the pins 56 are actuated by the whisks during their securement in the associated coupling device 20 (FIG. 5), and conversely from this upper position corresponding to the mounting of the whisks to the lower position in which the ejection member frees the whisks under the action of a manual control button 61 mounted resiliently in front of the handle 5 in the upper wall 62 of the housing 2, in immediate proximity to the front wall 63 of said housing.

In the upper portion 65 of the housing 2, behind the button 61, is mounted a manual operating button 67 having a cylindrical body 69, in this case of the rotating type with a rotation axis ZZ' substantially parallel to the axis XX' and transverse to the vertical displacement of the ejection member 51 in the direction of the arrow F (FIG. 1), and having a gripping finger piece 70 which extends outside the upper wall 62 of the housing 2. In a manner known per se, this button 67 is adapted to actuate an electric switch 71 which places the motor 7 into and out of service and controls its speed of rotation. To this end, the switch 71 can be brought, under the action of the button 67, to occupy a "stop" position (designated "0" in FIGS. 2 to 4, 6 to 8, 10 and 11), one or several successive "continuous operation" positions distributed in the clockwise direction, in this case three in number by way of strictly non-limiting example (designated V1, V2 and V3 in FIGS. 2 to 4, 6 to 8, 10 and 11), thereby choosing three speed levels for the motor 7, and an "instantaneous operation" position (designated VM in FIGS. 2 to 4, 6 to 8, 10 and 11) arranged in the counterclockwise position relative to the "stop" position corresponding to operations of short duration of the motor 7 obtained generally by continuously exerting pressure on the button 67. These different electrical switching positions of the switch 71, in this case "0", V1, V2, V3 and VM, are indicated with reference numerals marked on the upper wall 62 of the housing 2, in front of the electric switch actuating button 67.

The beater-mixer moreover comprises mechanical safety means, designated by the general reference numeral 72 in FIGS. 1, 5 and 9, which are adapted on the one hand to prevent bringing the switch to the "continuous operation" position, that is, to permit it to occupy only its "instantaneous operation" position VM, when the mixer foot 38 is secured in the socket 31 (FIG. 9), and on the other hand, to permit bringing the switch into "continuous operation" position V1, V2 or V3, or into the "instantaneous operation" position VM when the whisks 10 are each secured in the corresponding coupling device 20 (FIG. 5).

According to the invention, these mechanical means 72 comprise a movable member 74, in this case a metallic strip or rod which will be described in greater detail hereinafter, which is interposed between the movable ejection member 51 and the internal passage 76 of the socket 31, whose displacement is subject to the securement of the mixer foot 38 in the socket 31 (FIG. 9), against a return spring 78, and which is adapted to occupy two positions, namely:

a beating position (FIG. 5) in which it frees the displacement of the ejection member 51 which passes from its lower position to its upper position when the whisks 10 are each secured in the corresponding coupling device 20, the drive finger 53 of the ejection member 51 in upper position coming, when the rotatable button 67 is in the "0" position as shown in FIG. 6, into free engagement with the interior of a recess 82 (FIG. 6) provided in the body 69 of the button 67, bounded by two internal walls 84 and 85, and opening in a cutout 87 provided in the lower external surface of the body 69 of the button 67; the button 67, FIG. 6, being not blocked, it can thus turn toward its "continuous operation" positions V1, V2 and V3, as well as toward its "instantaneous operation" position VM;

a mixing position (FIG. 9) in which it blocks the ejection member 51 in lower position when the mixer foot 38 is fixed in the socket 31, the drive finger 53 of the ejection member 51 blocked in lower position being, when the rotatable button 67 is in the position "0" as shown in FIG. 10, in abutment against the edge 89 of the cutout 87 of the body 69 of the button 67 which is located on the side corresponding to its "continuous operation" positions; the button 67, FIG. 10, being blocked in rotation for its "continuous operation" positions by the drive finger 53 of the ejection member 51 blocked in lower position, it can thus turn only toward its "instantaneous operation" position VM.

As shown in FIGS. 2 to 4, 6 to 8, 10 and 11, the internal walls 84 and 85 of the recess 82 of the body 69 of the rotatable button 67 define together an angular sector which forms a predetermined angular clearance corresponding to the movement of rotation of the button 67 from its extreme "continuous operation" position V3 to its "instantaneous operation" position VM.

In the embodiment shown in FIGS. 1, 5 and 9, the strip 74 is mounted slidably, below the hollow portion 4 of the housing 2, in a horizontal direction, and has a forward portion in the form of a disconnectable blocking member 91 of the ejection member 51, and a rear portion in the form of a locking tongue 93 engaged, by its free end forming a lug 94, within the socket 31 through a slot 96 provided in the side wall 97 of the socket 31.

In this example, the disconnectable blocking member 91 is in the form of a vertical fork with three teeth 99, 100 and 101 whose free ends of two between them, namely the central tooth 100 and the upper tooth 101, are interconnected by an abutment surface 103.

As shown in FIGS. 1, 5 and 9, the return spring 78 of the strip 74 is a compression spring interposed between the lower portion of the locking tongue 93 of the strip 74 and a vertical fin 105 provided on the external surface of the side wall 97 of the socket 31, adjacent the bottom of this latter.

In the stop position of the beater-mixer, in the absence of any accessory, as shown in FIG. 1, the strip 74 occupies a rest position in which its forward portion with three teeth 99, 100 and 101 is in the disconnected position relative to the ejection member 51 in the lower position, which ejection member is thus freed, whilst its locking tongue 93 coacts by bearing with its lug 94 against the internal surface of the side wall 97 of the socket 31, under the action of the compression spring 78.

In this stop position, the rotatable button 67 is in "0" position for which the drive finger 53 of the ejection member 51 in lower position by the spring 58 is in abutment against the edge 89 of the cutout 87 of the body of the button 67, as seen in FIG. 2. Thanks to a ramp 107 extending into the recess 82 of the body of the button 67, from this edge 89, the user can turn the button 67 in the clockwise direction according to the arrow F1 of FIG. 2, toward any one of its "continuous operation" position V1, V2 or V3 for which the drive finger 53 of the ejection member 51 slides along the ramp 107, thereby permitting the continuous operation of the motor, see FIG. 3. The user can also turn the button 67 in the counterclockwise direction according to the arrow F2 in FIG. 2, toward its "instantaneous operation" position VM, the drive finger 53 of the ejection member 51 being, at the end of the path of the button 67, in bearing relationship against the other edge 108 of the cutout 87 of the body of the button from which extends the internal wall 84 of the recess 82, thereby permitting instantaneous operation of the motor, see FIG. 4.

Thus, the fact of being able to actuate the motor in the absence of the accessory, both in continuous operation and in instantaneous operation, is particularly advantageous because this permits the user to continuously assure himself of the good operation of the apparatus before its use.

Referring to FIG. 5, the strip 74 occupies its beating position which corresponds to its rest position of FIG. 1 in which the ejection member 51 is free and thereby permits the securement of the whisks 10. During engagement of each of the whisks 10 in the corresponding coupling device 20, FIG. 5, the free end of the whisk 10 urges the corresponding pin 56 of the ejection member 51 which passes from its high position in which an abutment surface 110 provided on the lower branch of the upper portion 52 of U shape of the ejection member 51 comes to face and is at a very reliable distance from the abutment surface 103 of the strip 74 so as to prevent, in this beating position, the mounting of the mixer foot in the socket 31.

In this beating position, the rotating button 67 being in the "0" position as shown in FIG. 6, the drive finger 53 of the ejection member 51 in upper position is in free engagement within the interior of the recess 82 of the body of the button 67 which is hence free in rotation. The user can thus turn the button 67 to bring the switch 71 either, by clockwise rotation of the button (arrow F1 in FIG. 6), into any of the "continuous operation" positions V1, V2 or V3 as shown in FIG. 7, thereby permitting continuous operation of the motor, or, by a counterclockwise rotation of the button (arrow F2 in FIG. 6), into the "instantaneous operation" position VM in which the internal wall 84 of the recess 82 of the body of the button 67 is in abutment against the drive finger 53 of the ejection member 51 as shown in FIG. 8, thereby permitting instantaneous operation of the motor.

From the beating position of FIG. 5, the whisks 10 can be freed by the ejection member 51 under the action of the manual control button 61, said ejection member 51 returning to its lower position as shown in FIG. 1.

With reference to FIG. 9, the strip 74 occupies its mixing position to which it is brought by sliding in the direction of the arrow G of FIG. 1, under the influence of the emplacement by screwing of the mixer foot 38, after opening the closure 45, thereby giving rise to the longitudinal displacement of the lug 94 of the locking tongue 93 within the socket 31, against the compression spring 78; at the end of screwing of the mixer foot 38, the shaft 39 of this latter is coupled with the drive 28. In this mixing position, FIG. 9, the upper portion of each pin 56 of the ejection member 51 is in lowered position is in engagement, by means of its engagement passage, with the lower tooth 99 of the forward portion of the strip 74; the ejection member 51 being blocked in lower position, the whisks can therefore not be secured in their respective coupling devices 20.

In this mixing position, the rotatable button 67 being in the "0" position as shown in FIG. 10, the drive finger 53 of the ejection member 51 blocked in lower position is in abutment against the edge 89 of the cutout 87 of the body of the button 67, thereby preventing the rotation of the button 67 toward its "continuous operation" positions V1, V2 or V3, and hence preventing the continuous operation of the motor, but permitting the rotation in the counterclockwise direction (arrow F2 in FIG. 10) of said button 67 toward its "instantaneous operation" position VM in which the drive finger 53, at the end of movement of the button 67, bears against the edge 108 of the cutout 87 of the body of the button 67, thereby permitting instantaneous operation of the motor, see FIG. 11.

From the mixing position of FIG. 9, the mixing foot 38 can be simply withdrawn by unscrewing, the strip 74 then returning, under the action of the compression spring 78, to its rest position as shown in FIG. 1.

We claim:

1. In a hand-held electric beater-mixer adapted to drive selectively at least one of a beating accessory and a mixing accessory, the beater-mixer comprising:

a housing of generally prismatic shape having a base, an upper wall, a rear wall, a hollow portion delimiting a handle, and enclosing an electric motor provided with a shaft;

two rotatable coupling devices operatively connected to the shaft of the motor, a first opening in the base for fixing the beating accessory to a first coupling device, a second opening for fixing the mixing accessory to the second coupling device;

an operating button for actuating a switch which controls the electric motor, said button having a body mounted in an upper portion of the housing in a region overhanging the beating accessory, the switch adapted to occupy a stop position, at least one continuous operation position, and an instantaneous operation position;

an ejection member co-acting with the first coupling device and vertically displaceable between a low position in the absence of the beating accessory to a high position when the beating accessory is engaged in the first coupling device; and mechanical means for preventing actuation of the switch into the continuous operation position or into the instantaneous operation position when the beating accessory is inserted in the first coupling device;

the improvement wherein the second opening is provided in the rear wall, the ejection member comprises in its upper portion a drive finger, and the mechanical means comprise a movable member interposed between the ejection member and the second coupling device, said movable member having a displacement which is subordinated to emplacement of the mixing accessory in the second coupling device, against resilient return means, and being adapted to occupy a beating position wherein the ejection member is free to pass from its low position to its high position with the drive finger freeing actuation of the button, and a mixing position wherein the ejection member is blocked in the low position with the drive finger blocking actuation of the button from a side corresponding to the continuous operation position.

2. Beater-mixer according to claim 1, wherein the body of the button has a recess bordered by two internal walls, said recess having a cutout for engaging the drive finger, said finger coming into free engagement within the recess when the beating accessory is inserted in the first coupling device, and being in abutment against an edge of the cutout located on the side corresponding to the continuous operation position when the mixing accessory is inserted into the second coupling device.

3. Beater-mixer according to claim 2, wherein the button is rotatably mounted about an axis substantially parallel to a longitudinal axis of the shaft of the motor and transverse to the vertical displacement of the ejection member, and the internal walls bordering the recess define together a circular sector forming an annual clearance corresponding to the movement of rotation of the button serving to bring the switch from its extreme continuous operation position to its instantaneous operation position.

4. Beater-mixer according to claim 1, wherein the second coupling device comprises a rotatable drive carried by a rear end of the shaft of the motor and disposed in a cylindrical socket facing the second opening, the mixing accessory comprising a shaft having a first end for coupling engagement with said drive during its engagement in the socket, and the moveable member being a sliding strip arranged horizontally below said hollow portion and having a forward portion in the form of a disconnectable blocking member, which in the absence of the mixing accessory, is in a disconnected condition relative to the ejection member so as to free said ejection member, and when the first end is coupled with said drive, the blocking member is in engagement against said resilient return means, with the ejection member being in the low position, the moveable member having a rear portion in the form of a locking tongue engaged by its free end within the socket through a slot provided in a side wall of the socket, said tongue co-acting in bearing relationship with an internal surface of the side wall of the socket in the absence of the mixing accessory, and being displaced, against said resilient return means, by the mixing accessory when the first end is coupled with said drive.

5. Beater-mixer according to claim 4, wherein the ejection member has a lower portion and an upper portion, the lower portion having a pin, the upper portion having at its base a first abutment surface, and the disconnectable blocking member is in the form of a vertical fork having an upper tooth, a central tooth, and a lower tooth, each of the central tooth and the upper tooth having a free end connected by a second abutment surface adapted to come into facing relationship with said first abutment surface when the beating accessory is inserted in the first coupling device, said pin having a passage for engagement with the lower tooth when the first end of the shaft is coupled with the drive.

6. Beater-mixer according to claim 4, wherein the resilient return means comprise a compression spring interposed between a lower portion of the locking tongue and a vertical fin provided on the external surface of the side wall of the socket.

\* \* \* \* \*